(12) United States Patent
Shiwa et al.

(10) Patent No.: US 11,660,723 B2
(45) Date of Patent: May 30, 2023

(54) AUTOMATIC POLISHING SYSTEM

(71) Applicant: Taikisha Ltd., Tokyo (JP)

(72) Inventors: Hideo Shiwa, Tokyo (JP); Genji Nakayama, Tokyo (JP); Yoshio Higashi, Tokyo (JP)

(73) Assignee: Taikisha Ltd., Tokyo (JP)

( * ) Notice: Subject to any disclaimer, the term of this patent is extended or adjusted under 35 U.S.C. 154(b) by 665 days.

(21) Appl. No.: 16/497,095

(22) PCT Filed: Feb. 4, 2019

(86) PCT No.: PCT/JP2019/003800
§ 371 (c)(1),
(2) Date: Sep. 24, 2019

(87) PCT Pub. No.: WO2019/198313
PCT Pub. Date: Oct. 17, 2019

(65) Prior Publication Data
US 2021/0308826 A1    Oct. 7, 2021

(30) Foreign Application Priority Data

Apr. 13, 2018  (JP) .............................. JP2018-077390

(51) Int. Cl.
| | |
|---|---|
| *B24B 51/00* | (2006.01) |
| *B24B 19/26* | (2006.01) |
| *B24B 27/00* | (2006.01) |
| *B24B 49/12* | (2006.01) |

(52) U.S. Cl.
CPC .............. *B24B 51/00* (2013.01); *B24B 19/26* (2013.01); *B24B 27/0076* (2013.01); *B24B 49/12* (2013.01)

(58) Field of Classification Search
CPC ..... B24B 51/00; B24B 19/26; B24B 27/0076; B24B 27/00; B24B 27/0038;
(Continued)

(56) References Cited

U.S. PATENT DOCUMENTS

2002/0090888 A1 * 7/2002 Nishihara ........... H01L 21/3212
451/6
2003/0210407 A1   11/2003 Xu
(Continued)

FOREIGN PATENT DOCUMENTS

| CN | 101356025 A | 1/2009 |
|---|---|---|
| CN | 107073674 A | 8/2017 |

(Continued)

*Primary Examiner* — Joel D Crandall
*Assistant Examiner* — Michael A Gump
(74) *Attorney, Agent, or Firm* — The Webb Law Firm

(57) ABSTRACT

In an automatic polishing system configured such that under control of a polishing robot and/or a polishing tool by a polishing controller, the polishing tool provides a polishing action on a polishing subject face, a color intensity measurement instrument is provided for measuring an intensity of a specified color in the polishing subject face. Based on the intensity of the specified color measured by this color intensity measurement instrument, the polishing controller controls the polishing robot and/or the polishing tool, so that an amount of polishing work by the polishing tool onto the polishing subject face is adjusted according to the intensity of the specified color.

8 Claims, 3 Drawing Sheets

(58) Field of Classification Search
CPC . B24B 27/0007; B24B 27/0015; B24B 49/12; B24B 49/006; B24B 49/04; B24B 49/02; B24B 49/045; B24B 7/00; B24B 7/10; B24B 7/18; B24B 17/04; G01B 11/24; G01B 11/00; G01B 11/2433; G01B 11/0683; G01B 11/30; G01B 11/303; G01B 11/306; G01N 21/84; G01N 21/17; G01N 21/25; G01N 21/251; G01N 21/27; G01N 21/29; G01N 2021/8433; G01N 2021/1765; G01N 2021/1768; G01N 2021/177; G01N 2021/1772; G01N 2021/1774; G01N 2021/1776; B25J 13/08; B25J 11/006; B25J 11/0065
USPC ............ 451/5; 356/600, 601, 402, 407, 425
See application file for complete search history.

(56) References Cited

U.S. PATENT DOCUMENTS

| | | | |
|---|---|---|---|
| 2007/0049168 A1* | 3/2007 | Fujita | B24B 49/12 451/6 |
| 2008/0180695 A1* | 7/2008 | Komiyama | G01B 11/306 451/6 |
| 2009/0038139 A1 | 2/2009 | Kerschner et al. | |
| 2010/0022166 A1* | 1/2010 | Kimba | B24B 9/065 451/6 |
| 2017/0312880 A1* | 11/2017 | Ishii | B24B 37/30 |
| 2019/0262968 A1 | 8/2019 | Ishii et al. | |

FOREIGN PATENT DOCUMENTS

| | | | |
|---|---|---|---|
| DE | 102008002730 A1 | 12/2009 | |
| EP | 2722138 A2 | 4/2014 | |
| GN | 101266915 A | 9/2008 | |
| JP | 592345 A | 4/1993 | |
| JP | H0592345 A | * 4/1993 | |
| JP | 5138531 A | 6/1993 | |
| JP | 2002283099 A | 10/2002 | |
| JP | 2003338493 A | 11/2003 | |
| JP | 20049259 A | 1/2004 | |
| JP | 200721634 A | 2/2007 | |
| JP | 200891951 A | 4/2008 | |
| JP | 201516540 A | 1/2015 | |
| JP | 2015139836 A | 8/2015 | |
| JP | 2016155202 A | 9/2016 | |
| JP | 20195825 A | 1/2019 | |
| NO | 9717173 A1 | 5/1997 | |
| WO | 2012083967 A1 | 6/2012 | |

* cited by examiner

AUTOMATIC POLISHING SYSTEM

CROSS-REFERENCE TO RELATED APPLICATIONS

This application is the United States national phase of International Application No. PCT/JP2019/003800 filed Feb. 4, 2019, and claims priority to Japanese Patent Application No. 2018-077390 filed Apr. 13, 2018, the disclosures of which are hereby incorporated by reference in their entirety.

TECHNICAL FIELD

This disclosure relates to an automatic polishing system for carrying out a polishing treatment on a surface of a treatment subject.

More particularly, the invention relates to an automatic polishing system including a polishing robot holding a polishing tool and a polishing controller, the system being configured such that under control of the polishing robot and/or the polishing tool by the polishing controller, the polishing tool carries out a polishing action on a polishing subject face.

BACKGROUND ART

As an automatic polishing system configured to carry out a polishing treatment on a polishing subject face of a treatment subject with using a polishing robot holding a polishing tool, there was previously proposed a polishing system configured such that the polishing controller is caused to recognize a three-dimensional shape of the polishing subject face and then, under control of the polishing robot or the polishing tool by the polishing controller based on the recognized three-dimensional shape of the polishing subject face, the polishing robot or the polishing tool is caused to move according to a mode of movement suited to the three-dimensional shape of the polishing subject face (Patent Document 1 identified below).

BACKGROUND ART DOCUMENT

Patent Document

Patent Document 1: Japanese Patent Application No. 2017-121582

SUMMARY OF THE INVENTION

Problems to be Solved by Invention

However, like e.g. a case of a surface of a putty coat, a paint coat formed on a surface of the treatment subject constituting a polishing subject surface, if a lower layer portion (i.e. a shape forming base material of the treatment subject) having material quality or property different from an outer layer portion (i.e. a putty coat, a paint coat, etc.) constituting the polishing subject face exists under the outer layer portion whose surface constitutes the polishing subject face, with simply moving the polishing robot or the polishing tool according to the three-dimensional shape of the polishing subject face, due to presence of irregularity in the thickness of the outer layer portion, even a small amount/degree of polishing can cause an over-polishing trouble as the polishing tool may inadvertently reach the lower layer portion to expose this lower layer portion of the base material or the like or to damage the lower layer portion, thus inviting treatment quality deterioration or necessity of a repair work.

In view of the above-described state of the art, the principal object of the present invention is to make it possible to avoid reliably such over-polishing trouble in automatic polishing using a polishing robot.

Solution

A first characterizing feature of the present invention relates to an automatic polishing system and according to this feature, the automatic polishing system comprises a polishing robot holding a polishing tool and a polishing controller, the system being configured such that under control of the polishing robot by the polishing controller or control of the polishing robot and the polishing tool by the polishing controller, the polishing tool carries out a polishing action on a polishing subject face;

wherein there is provided a color intensity measurement instrument for measuring intensity of a specified color on the polishing subject face; and based on the intensity of the specified color measured by the color intensity measurement instrument, the polishing controller controls either the polishing robot alone or both the polishing robot and the polishing tool, so that an amount of polishing work by the polishing tool on the polishing subject face is adjusted according to the intensity of the specified color.

With the above-described configuration, in accordance with a color intensity of a specified color on the polishing subject face, the amount of polishing work by the polishing tool on the polishing subject face is adjusted. Therefore, if the color of the lower layer portion present beneath the outer layer portion whose surface constitutes the polishing subject face is selected in advance as the "specified color", then, it can be determined that the higher the intensity of the color ("specified color") of the lower layer portion appearing on the polishing subject face through the outer surface layer, the smaller the thickness of the outer layer portion, and the amount of polishing work by the polishing tool on the polishing subject face may be reduced correspondingly.

Alternatively, if the color of the outer layer portion whose surface constitutes the polishing subject face is selected in advance as the "specified color", then, it can be determined that the higher the color density of the lower layer portion appearing on the polishing subject face through the outer layer portion and the lower the intensity of the color ("specified color") of the outer layer portion correspondingly therewith, the smaller the thickness of the outer layer portion, and the amount of polishing work by the polishing tool on the polishing subject face may be reduced correspondingly.

Therefore, with the above-described configuration, irrespectively of presence/absence of thickness irregularity in the outer layer portion, it is possible to reliably avoid the over-polishing trouble occurring e.g. when the polishing tool inadvertently reaches the lower layer portion to expose this lower layer portion of the base material or the like or to damage the lower layer portion.

Thus, in a polishing treatment of a polishing subject face, high quality treatment can be obtained in a stable manner.

A second characterizing feature of the present invention specifies a preferred mode of embodying the first characterizing feature configuration. According to this feature:

there is provided a shape measurement instrument for measuring a three-dimensional shape of the polishing subject face;

based on the three-dimensional shape measured by the shape measurement instrument, the polishing controller controls the polishing robot, whereby the polishing tool is moved to respective parts of the polishing subject face one after another; and concurrently with the movement, the polishing controller controls either the polishing robot alone or both the polishing robot and the polishing tool, so that the amount of polishing works by the polishing tool on the respective parts of the polishing subject face are adjusted according to the intensities of the specified color at the respective parts.

With the above-described configuration, under the control based on the three-dimensional shape of the polishing subject face, the polishing tool is moved to respective parts of the polishing subject face one after another. Thus, even when the area of the polishing subject face is large, it is still possible to carry out a polishing treatment on this whole polishing subject face all over.

And, concurrently with the movement of the polishing tool, the amount of polishing works by the polishing tool on the respective parts of the polishing subject face are adjusted according to the intensity of the specified color. Therefore, irrespectively of presence of irregularity in the thickness in the outer layer portion of respective part of the polishing subject face, at a part where the thickness of the outer layer portion is small, it is reliably possible to avoid the occurrence of the over-polishing trouble of the lower layer portion such as the base material becoming exposed.

A third characterizing feature of the present invention specifies a preferred mode of embodying the first or second characterizing feature configuration. According to this feature:

there is provided a shape measurement instrument for measuring a three-dimensional shape of the polishing subject face;

as the polishing treatment on the polishing subject face, the polishing controller effects an antecedent polishing treatment and a succedent polishing treatment;

in the antecedent polishing treatment, based on the three-dimensional shape measured by the shape measurement instrument, the polishing controller controls either the polishing robot alone or both the polishing robot and the polishing tool, so that the amounts of polishing works by the polishing tool on the respective parts of the polishing subject face are adjusted according to the three-dimensional shape; and in the succedent polishing treatment, based on the intensity of the specified color of the respective part of the polishing subject face measured by the color intensity measurement instrument after the antecedent polishing treatment, the polishing controller controls either the polishing robot alone or both the polishing robot and the polishing tool, so that the amounts of polishing works by the polishing tool on the respective parts of the polishing subject face are adjusted according to the intensities of the specified color.

With the above-described configuration, by the antecedent polishing treatment in which the amounts of polishing works by the polishing tool on the respective parts of the polishing subject face are adjusted according to the three-dimensional shape of the polishing subject face, the thickness of the outer layer portion of the respective part of the polishing subject face is reduced to a certain degree to allow the color of the lower layer portion to appear easily on the surface of the outer layer portion.

Namely, it is possible to make the intensity difference of the specified color (the color of the lower layer portion or the color of the outer layer portion) to appear clearly, between the respective pars of the polishing subject face.

And, in combination with the above-described highlighting of intensity difference of the specified color between the respective parts of the polishing subject face, by implementing the succedent polishing treatment in which the polishing work amount of the polishing tool for respective part of the polishing subject face is adjusted according to the intensity of the specified color at the respective parts of the polishing subject face, the polishing work amount of the polishing tool for the respective part of the polishing subject face can be adjusted even more finely according to the thickness of the outer layer portion of the respective part of the polishing subject face.

Therefore, it is possible not only to reliably avoid the over-polishing trouble, but also to improve the treatment quality of the polishing treatment on the polishing subject.

A fourth characterizing feature of the present invention specifies a preferred mode of embodying the second or third characterizing feature configuration. According to this feature:

there is provided a camera for photographing the polishing subject face;

the shape measurement instrument measures a three-dimensional shape of the polishing subject face based on image data of the polishing subject face obtained by the photographing by the camera; and the color intensity measurement instrument measures the intensity of the specified color on the polishing subject face, based on the image data of the polishing subject face obtained by photographing by the camera.

With the above-described configuration, a camera is used not only for measurement of the three-dimensional shape of the polishing subject face, but also for measurement of the specified color intensity on the polishing subject face. Therefore, as compared with an arrangement of using separate cameras for measurement of the three-dimensional shape of the polishing subject face and for measurement of the specified color intensity respectively, the system cost can be reduced and also the system configuration can be made simple.

A fifth characterizing feature of the present invention specifies a preferred mode of embodying any one of the first through fourth characterizing feature configurations. According to this feature:

the color intensity measurement instrument obtains a plurality of kinds of image data with different colors of irradiation light beam by causing the camera to photograph the polishing subject face with changing the color of irradiation light beam onto the polishing subject face and then measures the intensity of the specified color on the polishing subject face, based on the plurality of kinds of image data.

With the above-described configuration, the intensity of the specified color on the polishing subject face is measured, based on changes in light reflection state of the polishing subject face in response to changes of the colors of the irradiation light beam obtained from the plurality of kinds of image data of different irradiation light beam colors. Therefore, only changing of the color of the irradiation light beam is needed for the measurement of the intensity of the specified color on the polishing subject face. Whereas, as the camera for use in photographing the polishing subject face, a monochrome camera will be sufficient.

Thus, in comparison with an arrangement in which the intensity of the specified color on the polishing subject faced is measured by using a polychrome camera, the system cost can be reduced.

A sixth characterizing feature of the present invention specifies a preferred mode of embodying the fourth or fifth characterizing feature configuration. According to this feature:

there is provided a measurement robot holding the camera; and as the polishing controller controls the measurement robot, the camera is moved to a requisite photographing position for the polishing subject face.

With this configuration, as the measurement of the specified color intensity on the polishing subject face with using the camera and the measurement of the three-dimensional shape of the polishing subject face can be automated, so that the burden on a worker can be further reduced, in comparison with the worker operating the measurement camera.

Moreover, in correspondence with the above, the treatment efficiency of the polishing treatment too can be further increased.

A seventh characterizing feature of the present invention specifies a preferred mode of embodying any one of the first through sixth characterizing feature configurations. According to this feature:

the polishing controller controls the speed of movement of the polishing robot based on the intensity of the specified color, thereby to adjust the movement speed of the polishing tool on the polishing subject face, so that the polishing work amount of the polishing tool on the polishing subject face is adjusted according to the intensity of the specified color.

With the above-described configuration, as the polishing controller controls the speed of movement of the polishing robot based on the intensity of the specified color, the polishing work amount of the polishing tool on the polishing subject face is adjusted. Thus, for the adjustment of the polishing work amount, only controlling of the movement of the polishing robot holding the polishing tool may be sufficient.

And, the system can be simplified and the system cost can be reduced correspondingly therewith.

An eighth characterizing feature of the present invention specifies a preferred mode of embodying any one of the first through sixth characterizing feature configurations. According to this feature:

as the polishing controller controls a rotational speed per unit time of the polishing tool of a drive rotation type, the polishing work amount of the polishing tool on the polishing subject face is adjusted according to the intensity of the specified color.

With the above-described configuration, as the polishing controller controls a rotational speed per unit time of the polishing tool of a drive rotation type, the polishing work amount of the polishing tool on the polishing subject face is adjusted according to the intensity of the specified color. Thus, for the movement control of the polishing robot holding the polishing tool, only controlling for moving the polishing tool to a predetermined polishing position may be made sufficient.

And, the control arrangement can be simplified correspondingly therewith.

Incidentally, in embodying any one of the first through sixth characterizing feature configurations, in a mode of embodying the seventh characterizing feature configuration and the eighth characterizing feature configuration in combination, both the arrangement of adjusting the polishing work amount of the polishing tool on the polishing subject face by controlling a movement speed of the polishing tool relative to the polishing subject face and the further arrangement of adjusting the polishing work amount of the polishing tool on the polishing subject face by adjusting a rotational speed per unit time of the polishing tool of a drive rotation type may be implemented in combination.

EMBODIMENTS

Figure 1:
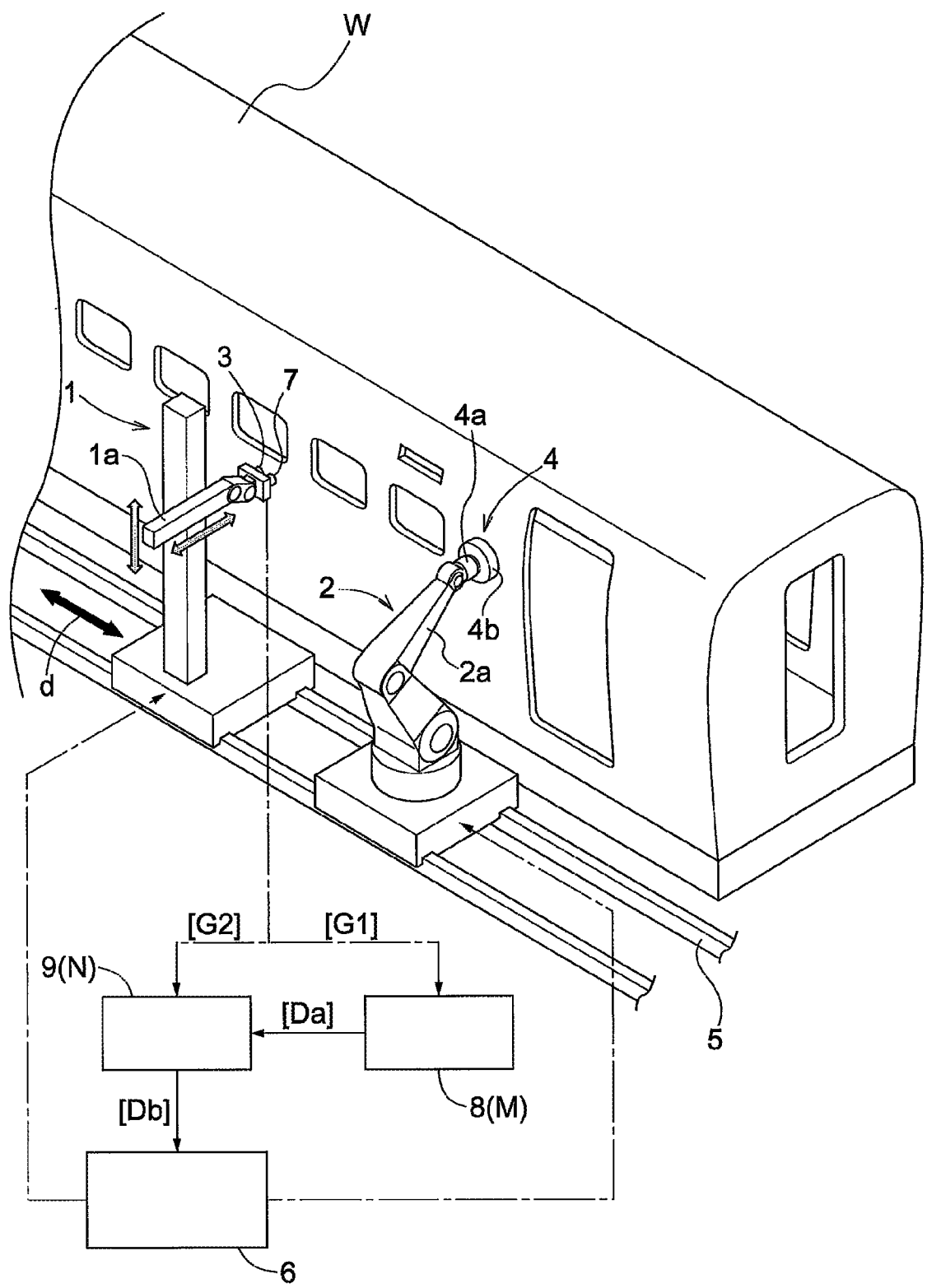
FIG. 1 is a schematic view showing a system configuration of an automatic polishing system.
Figure 2:
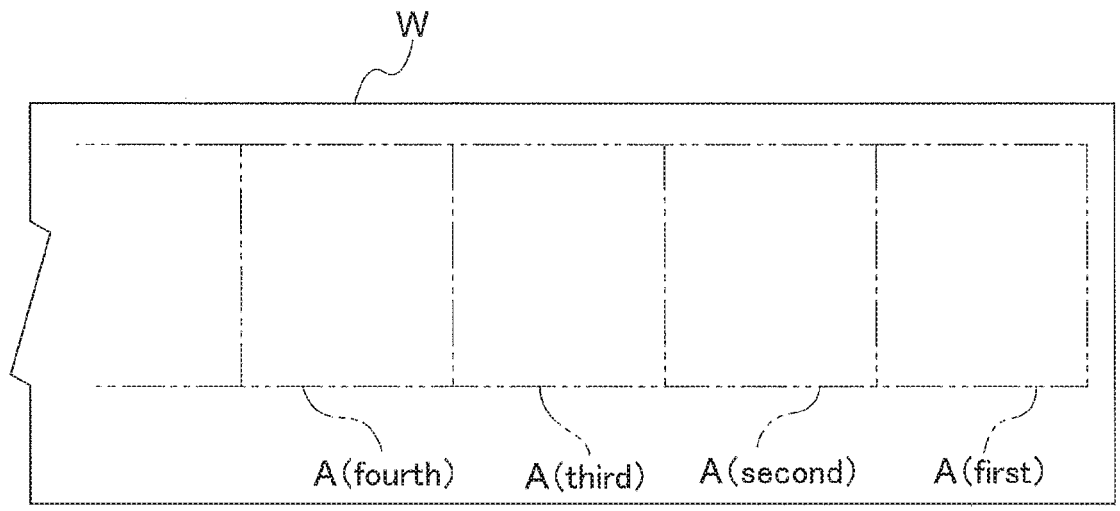
FIG. 2 is an explanatory view illustrating mode of division of a polishing subject face.

FIG. 1 shows an automatic polishing system. This automatic polishing system carries out a polishing treatment on a surface of a putty coat formed on a surface of base material of a treatment subject W (a railway car in this example).

Namely, on the surface of a base material (ur) forming the treatment subject W (see FIG. 4), the putty coat (sr) is formed as a first coating treatment for a finish paint. By carrying out a polishing treatment on the surface of this putty coat (sr), a painting first coat suitable for finishing painting of the treatment subject W is formed.

Adjacent the treatment subject W with the putty coat (sr) formed thereon, a measurement robot 1 and a polishing robot 2 are set side by side along a longitudinal direction (d) of the treatment subject W and an arm 1a of the measurement robot 1 holds a measurement camera 3 at its leading end.

Further, an arm 2a of the polishing robot 2 holds a drive rotation type polishing device 4 as a "polishing tool". This drive rotation type polishing device 4 is configured such that as a polishing rotor 4b rotated by a motor 4a is brought into contact with the surface of the putty coat (sr), the surface of the putty coat (sr) as "polishing subject face A" is polished.

The measurement robot 1 and the polishing robot 2 both are mounted on common rails 5 installed along the treatment subject W and each one of the measurement robot 1 and the polishing robot 2 can move and travel on the common rails 5 along the longitudinal direction (d) of the treatment subject W, under control by a polishing controller 6.

For the polishing treatment, the outer face of the treatment subject W on which the putty coat (sr) is formed is divided in advance into a plurality of polishing subject faces A. In operation, as the polishing controller 6 controls a traveling movement and an arm action of the measurement robot 1, the measurement camera 3 is moved to a predetermined measurement position suitable for photographing a first polishing subject face A and at this measurement position, the measurement camera 3 firstly photographs the first polishing subject face A, as a "first measurement", in accordance with a control instruction from the polishing controller 6.

Figure 3:
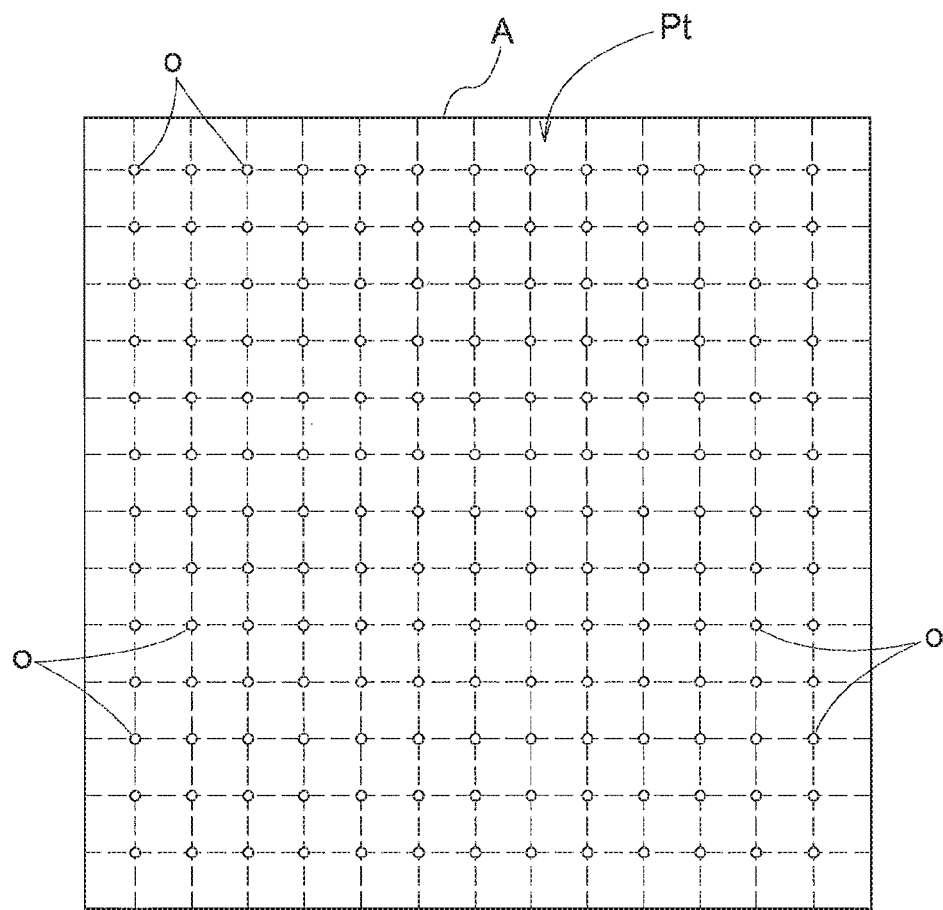
FIG. 3 is an explanatory view schematically showing a projection pattern.

Also, in this photographing, a projector 7 mounted to a leading end of the arm 2a of the measurement robot 2 projects a dot-group pattern Pt such as one shown in FIG. 3 onto the first polishing subject face A in accordance with a control instruction from the polishing controller 6. Then, the measurement camera 3 photographs the first polishing subject face A with this dot-group pattern Pt being projected thereon.

The dot-group pattern Pt comprises many dot images (o) arranged in the form of a matrix. The relative positional relations between/among the dot images (o) in the dot-group pattern Pt projected on the polishing subject face A by the projector 7 will change according to the three-dimensional shape of the polishing subject face A as the projection plane.

In succession to the first measurement described above, the polishing controller 6 switches the color of irradiation light beam irradiated by the projector 7 onto the first polishing subject face A (namely, the color of the light source of the projector 7) to a different color. In response to this switchover of the color of the irradiation light beam and in accordance with a control instruction from the polishing controller 6, the measurement camera 3 photographs, as a "second measurement", the respective first polishing subject face A being irradiated with irradiation light beams of the respective colors.

After completion of the first measurement and the second measurement on the first polishing subject faces A, by a traveling movement and an arm action of the measurement robot 1, the measurement camera 3 is moved to a predetermined measurement position suitable for photographing the next second polishing subject face A; and also in succession to this camera movement, by a traveling movement and an arm action of the polishing robot 2, the polishing device 4 is moved to a position suitable for polishing treatment on the first polishing subject face A after the above-described measurements thereof.

Thereafter, the polishing controller 6 controls the polishing robot 2 and the polishing device 4, based on surface condition data Db to be described below which are obtained from image data G1, G2 outputted from the measurement camera 3 in the first and second measurements on the first polishing subject face A, so that as the polishing treatment on the first polishing subject face A, in association with arm movements of the polishing robot 2 (if necessary, arm movements involving also traveling movements of the polishing robot 2), the polishing device 4 is caused to provide a polishing action on respective parts of the first polishing subject face A while moving the polishing device 4 to these respective parts of the first polishing subject face A one after another.

Further, during the polishing treatments on the first polishing subject face A, the first measurement and the second measurement on the second polishing subject face A will be respectively carried out by the measurement camera 3 and the projector 7, like the first and second measurements on the first polishing subject face A described above.

Thereafter, while the polishing device 4 is carrying out a polishing action on one polishing subject face A, the measurement camera 3 and the projector 7 will carry out the first measurement and the second measurement on the next polishing subject face A. In this manner, the polishing controller 6 will carry out the first measurement, the second measurement and the polishing treatment subsequent to these measurements one after another on the respective polishing subject face A.

The first image data G1 (i.e. image data of the polishing subject face A on which the dot-group pattern Pt is projected) outputted from the measurement camera 3 in the first measurement on the respective polishing subject face A is sent to a shape analyzer 8.

In this shape analyzer 8, based on the first image data G1 sent from the measurement camera 3, relative position relations between/among the dot images (o) in the dot-group pattern Pt projected on the polishing subject face A are analyzed, whereby three-dimensional coordinates ($\alpha$, $\beta$, $\gamma$) of each dot (q) on the polishing subject face A are calculated. And, the results of these calculations are sent as the three-dimensional shape data Da of the polishing subject face A from the shape analyzer 8 to a color intensity analyzer 9.

Figure 4:
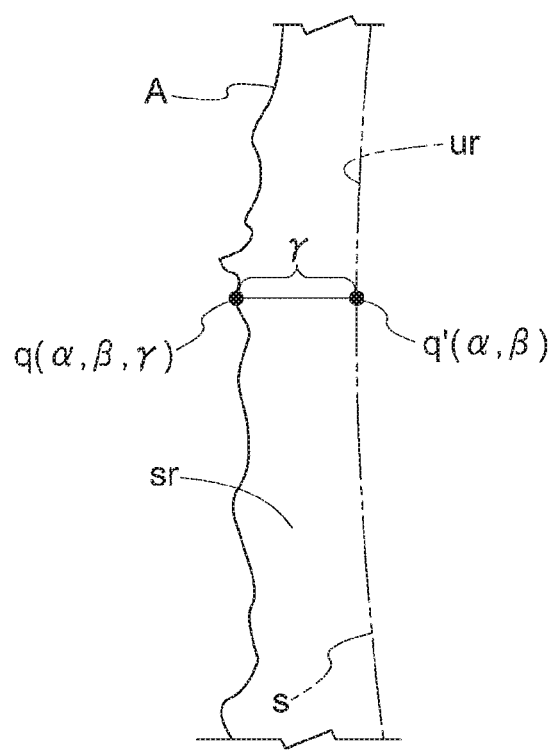
FIG. 4 is an explanatory view schematically showing a section of a putty coat.

Incidentally, as shown schematically in FIG. 4, the three-dimensional coordinates ($\alpha$, $\beta$, $\gamma$) of each dot (q) on the polishing subject face A calculated in the shape analyzer 8 consist of position coordinates ($\alpha$, $\beta$) of a corresponding dot (q') on a reference plane (s) preset based on e.g. design data of the treatment subject W and a height coordinate ($\gamma$) of the respective dot (q) in the direction perpendicular to the reference plane (s).

Here, the above-described reference plane (s) is a plane corresponding to the surface of the base material (ur) such as a metal material forming the treatment subject W.

On the other hand, the second image data G2 outputted from the measurement camera 3 in the second measurement on the respective polishing subject face A (i.e. image data of the polishing subject face A with different colors of irradiation light beam) is sent together with the above-described three-dimensional shape data Da (=$\phi$q ($\alpha$, $\beta$, $\gamma$)) outputted from the shape analyzer 8 to the color intensity analyzer 9.

In the color intensity analyzer 9, based on the second image data G2 sent from the measurement camera 3, change in light reflection state at the respective part on the polishing subject face A before/after the switchover of the color of the irradiation light beam is analyzed, whereby an intensity (x) of a specified color Cs at the respective part on the polishing subject face A is calculated.

Further, in the color intensity analyzer 9, by superposing the calculated intensity (x) of the specified color Cs at the respective part on the polishing subject face A on the three-dimensional shape of the polishing subject face A, color intensity added three dimensional coordinates ($\alpha$, $\beta$, $\gamma$, x) of each dot (q) on the polishing subject face A are calculated and the result of these calculations are sent as surface state data Db of the polishing subject face A from the color intensity analyzer 9 to the polishing controller 6.

Incidentally, in this embodiment, as the specified color Cs described above, the surface color of the base material (ur) forming the polishing subject face W (specifically, the color of the primer layer applied on the surface of the base material (ur)) is selected.

Figure 5:
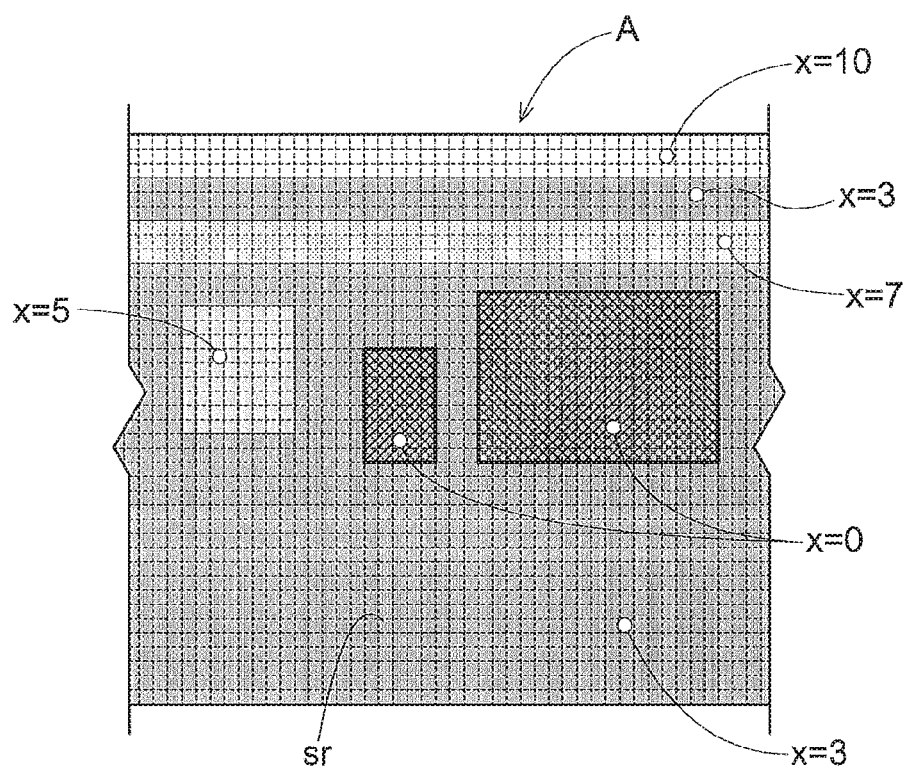
FIG. 5 is an explanatory view schematically showing intensity distribution of a specified color on a polishing subject face.

FIG. 5 is a view which schematically shows distribution of the intensities (x) of the above-described specified color Cs. In this embodiment, in the color intensity analyzer 9, the intensity (x) of the specified color Cs at the respective part on the polishing subject face A is classified into 11 (eleven) levels: from 0 to 10, so that the value of the intensity (x) becomes closer to 10 as the specified color Cs becomes stronger, and a part at which the specified color Cs was not measured gives an intensity x=0.

Namely, as the thickness (=$\gamma$) of the putty coat (sr) becomes smaller, the intensity of the base material color (specified color Cs) exposed on the surface of the putty coat (sr) through this putty coat (sr) becomes higher, thus the value of the above-described intensity (x) approaching the value of 10 (ten).

Then, the polishing controller 6 controls the polishing robot 2 and the polishing device 4 to carry out polishing treatments on the respective polishing subject faces A one after another, based on this surface state data Db (=$\phi$q ($\alpha$, $\beta$, γ, x)). More particularly, the polishing controller 6 will control movements of the polishing robot 2 based on the three-dimensional shape data portion (=Da) included in the surface state data Db, while causing the polishing rotor 4$b$ of the polishing device 4 to provide its polishing action at a predetermined rotational speed on the polishing subject face A (=the surface of the putty coat (sr)), thus moving the polishing device 4 along the polishing subject face A.

Also, in the movement of the polishing device 4 along the polishing subject face A, the polishing controller 6 controls actions of the polishing robot 2 based on the surface state data Db (=φq (α, β, γ, x)), whereby the higher the intensity (x) of the specified color Cs at the respective part of the polishing subject face A, the greater the movement speed (v) (i.e. passage speed) of the polishing device 4 for the respective part of the polishing subject face A is provided.

Namely, through this adjustment of the movement speed (v), among the respective parts of the polishing subject face A, for a part having a higher intensity (x) of the specified color Cs (=base material color), thus a smaller thickness (γ) of the putty coat (sr), the polishing work amount of the polishing device 4 for this part will be decreased correspondingly. With this, it is possible to avoid the over-polishing trouble occurring when the polishing made by the polishing device 4 inadvertently reaches the base material (ur), thus exposing this base material (ur).

Incidentally, for a part having the intensity x=0, a polishing treatment thereon will be omitted, as this part is presumed to constitute an "opening portion" (i.e. a portion where the base material (ur) is not present), exemplified by a window of the treatment subject W.

As described above, in the automatic polishing system of this embodiment, the measurement camera 3, the projector 7, and the shape analyzer 8 together constitute a "shape measurement instrument M" for measuring a three-dimensional shape of the polishing subject face A, and the measurement camera 3, the projector 7 and the color intensity analyzer 9 together constitute a "color intensity measurement instrument N" for measuring the intensity (x) of the specified color Cs in the polishing subject face A.

And, the automatic polishing system of this embodiment is configured basically such that as the polishing controller 6 controls the polishing robot 2 and the polishing device 4 (polishing tool) based on the intensity (x) of the specified color Cs measured by the color intensity measurement instrument N, the polishing work amount of the polishing device 4 on the polishing subject face A is adjusted according to the intensity (x) of the specified color Cs.

Further Embodiments

Next, further embodiments of the present invention will be described one by one.

The polishing controller 6 is configured to carry out an antecedent polishing treatment and a succedent polishing treatment subsequent thereto, as the "polishing treatment" on the polishing subject face A.

And, in the antecedent polishing treatment, based on the three-dimensional shape of the polishing subject face A measured by the shape measurement instrument M, the polishing controller 6 controls the polishing robot 2 or the polishing tool 4, such that the polishing work amount of the polishing tool 4 on the respective part of the polishing subject face A may be adjusted according to the three-dimensional shape of the polishing subject face A.

And, in the succedent polishing treatment subsequent thereto, based on the intensity of the specified color Cs of the respective part of the polishing subject face A measured by the color intensity measurement instrument N after the antecedent polishing treatment, the polishing controller 6 controls the polishing robot 2 and/or the polishing tool 4, so that the amounts of polishing works by the polishing tool 4 on the respective parts of the polishing subject face A are adjusted according to the intensities (x) of the specified color (Cs).

The polishing tool 4 can be a drive type polishing device configured to rotate or vibrate its polishing action portion for providing a polishing action on the polishing subject face A by means of a dedicated drive device or can also be a passive type polishing tool configured to provide a sliding contact polishing action on the polishing subject face A by an action of the polishing robot 2.

Further, in adjusting the polishing work amount of the polishing tool 4 on the polishing subject face A, the method of adjusting the polishing work on the polishing subject face A is not limited to the method of adjusting the polishing work on the polishing subject face A by varying the movement speed of the polishing tool 4 relative to the polishing subject face A as disclosed in the foregoing embodiment, but may also be a method of adjusting the polishing work on the polishing subject face A by varying a rotational speed or a vibration rate per unit time of the polishing action portion in a drive type polishing device or a method of adjusting the polishing work on the polishing subject face A by varying a pressed contact force of the polishing tool 4 relative to the polishing subject face A or varying a polishing rotation speed relative to the polishing subject face A. In this way, various kinds of adjusting methods can be employed.

In the foregoing embodiment, there was disclosed an example in which a surface of a putty coat or a paint coat formed on the surface of the base material (ur) is used as the polishing subject face A. However, the invention is not limited thereto, but the automatic polishing system of the invention may be applied also to a polishing treatment on any polishing subject W that has a lower layer portion (ur) having a different color from an outer layer portion (sr) is present beneath the outer layer portion (sr) whose surface constitutes the treatment subject face A.

The specified color Cs any be either the color of the lower layer portion (ur) such as the base material or the color of the outer layer portion (sr), or can also be a plurality of different colors.

INDUSTRIAL APPLICABILITY

The automatic polishing system according to the present invention can be used for a polishing treatment of various kinds of treatment subjects in a variety of fields.

DESCRIPTION OF SIGNS

4: polishing device (polishing tool)
2: polishing robot
6: polishing controller
A: polishing subject face
Cs: specified color
x: intensity
N (3, 7, 9): color intensity measurement instrument
M (3, 7, 9): shape measurement instrument
3: camera
7: projector
8: shape analyzer
9: color intensity analyzer
G1, G2: image data
1: measurement robot
v: movement speed

The invention claimed is:

1. A polishing system for polishing a polishing subject article including a base material and a surface layer having a color different from the base material, comprising:
   a polishing tool for carrying out a polishing action on a polishing subject face of the polishing subject article;
   a color intensity analyzer for measuring intensity of a specified color on the polishing subject face;
   a rail for allowing the polishing tool and the color intensity analyzer to move along a longitudinal direction of the polishing subject article; and
   a controller for determining a speed of movement of the polishing tool relative to the polishing subject face based on the intensity of the specified color measured by the color intensity analyzer.

2. The polishing system of claim 1, further comprising a shape measurement instrument for measuring a three-dimensional shape of the polishing subject face, wherein
   the controller controls the polishing tool to move to parts of the polishing subject face one after another based on the three-dimensional shape measured by the shape measurement instrument.

3. The polishing system of claim 2, further comprising a camera for photographing the polishing subject face, wherein
   the shape measurement instrument measures the three-dimensional shape of the polishing subject face based on image data of the polishing subject face obtained by the camera; and
   the color intensity analyzer measures the intensity of the specified color on the polishing subject face, based on the image data.

4. The polishing system of claim 3, further comprising a measurement robot holding the camera.

5. The polishing system of claim 1, further comprising a shape measurement instrument for measuring a three-dimensional shape of the polishing subject face, wherein the controller carries out a first polishing action to the polishing subject face based on the three-dimensional shape measured by the shape measurement instrument, and then carries out a second polishing action to the polishing subject face based on the intensity of the specified color measured by the color intensity analyzer.

6. The polishing system of claim 1, wherein the specified color whose intensity is measured by the color intensity analyzer comprises a plurality of different colors.

7. The polishing system according to claim 1, wherein a first speed of movement of the polishing tool determined when a first intensity of the specified color is measured by the color intensity analyzer is larger than a second speed of movement of the polishing tool determined when a second intensity of the specified color which is larger than the first intensity of the specified color is measured by the color intensity analyzer.

8. The polishing system according to claim 1, wherein the polishing tool and the color intensity analyzer are set side by side along the longitudinal direction of the polishing subject article.

* * * * *